(12) United States Patent
Weber et al.

(10) Patent No.: US 7,636,612 B2
(45) Date of Patent: Dec. 22, 2009

(54) METHOD FOR OPTIMIZING THE TRANSPORT DISPLACEMENT OF WORKPIECES IN TRANSFER PRESSES

(75) Inventors: Elmar Weber, Ostrach (DE); Hermann Benkler, Wolpertswende (DE)

(73) Assignee: Mueller Weingarten AG, Weingarten (DE)

( * ) Notice: Subject to any disclaimer, the term of this patent is extended or adjusted under 35 U.S.C. 154(b) by 202 days.

(21) Appl. No.: 11/943,078

(22) Filed: Nov. 20, 2007

(65) Prior Publication Data

US 2008/0109105 A1 May 8, 2008

Related U.S. Application Data

(63) Continuation of application No. PCT/DE2006/000476, filed on Mar. 16, 2006.

(30) Foreign Application Priority Data

May 27, 2005 (DE) ........................ 10 2005 024 822

(51) Int. Cl.
*G06F 19/00* (2006.01)
*G05B 19/18* (2006.01)
*G06F 7/62* (2006.01)
*G06F 9/44* (2006.01)

(52) U.S. Cl. .................. 700/173; 700/28; 700/159; 700/178; 700/250; 700/255; 703/13; 717/124; 717/135

(58) Field of Classification Search ............... 700/28, 700/159–160, 173, 177–178, 250, 255; 703/13; 717/124, 135
See application file for complete search history.

(56) References Cited

U.S. PATENT DOCUMENTS

| | | | | |
|---|---|---|---|---|
| 4,338,672 A | * | 7/1982 | Perzley et al. | 700/249 |
| 5,848,260 A | * | 12/1998 | Chen et al. | 703/5 |
| 5,952,806 A | * | 9/1999 | Muramatsu | 318/568.12 |
| 6,065,857 A | * | 5/2000 | Hazama et al. | 700/95 |
| 6,219,586 B1 | * | 4/2001 | Sakai | 700/182 |
| 6,290,571 B1 | * | 9/2001 | Dilger et al. | 451/5 |
| 6,341,243 B1 | | 1/2002 | Bourne et al. | |
| 6,901,309 B2 | | 5/2005 | Hertinger | |
| 6,968,725 B2 | | 11/2005 | Harsch et al. | |
| 7,187,998 B2 | * | 3/2007 | Okamoto et al. | 700/245 |
| 7,395,606 B2 | * | 7/2008 | Crampton | 33/503 |
| 2003/0004604 A1 | | 1/2003 | Goto | |
| 2006/0241813 A1 | * | 10/2006 | Babu et al. | 700/255 |
| 2007/0269297 A1 | * | 11/2007 | Meulen et al. | 414/222.01 |

FOREIGN PATENT DOCUMENTS

| | | |
|---|---|---|
| DE | 27 47 238 A1 | 4/1979 |
| DE | 41 21 841 A1 | 1/1992 |
| DE | 43 23 831 A1 | 2/1995 |
| DE | 100 09 574 A1 | 8/2001 |
| DE | 695 29 607 T2 | 9/2003 |
| DE | 103 07 261 A1 | 9/2004 |
| EP | 0 837 379 A1 | 4/1998 |
| GB | 2 227 697 A1 | 8/1990 |

\* cited by examiner

*Primary Examiner*—Ramesh B Patel
(74) *Attorney, Agent, or Firm*—Burr & Brown

(57) ABSTRACT

A simulation method for optimizing transport displacement of workpieces in transfer presses is provided. Conclusions relating to the freedom of motion, number of strokes and program data for tool-specific machine control are determined by manipulating a displacement curve on a digital image of the transfer press which is determined by the simulation method.

5 Claims, 3 Drawing Sheets

METHOD FOR OPTIMIZING THE TRANSPORT DISPLACEMENT OF WORKPIECES IN TRANSFER PRESSES

CROSS REFERENCE TO RELATED APPLICATIONS

This application is a continuation of International Application No. PCT/DE2006/000476 having an international filing date of Mar. 16, 2006, which designated the United States, and claims the benefit under 35 USC §119(a)-(d) of German Application No. 10 2005 024 822.05, filed May 27, 2005, the entireties of which are incorporated herein by reference.

FIELD OF THE INVENTION

The invention relates to a method for optimizing the transport displacement of workpieces in transfer presses, in which method, by the manipulation of a displacement curve in a map of the transfer press, conclusions can be drawn as to freedoms of movement, numbers of strokes and program data for tool-specific machine control.

BACKGROUND OF THE INVENTION

Workpieces, during the production of which a plurality of work operations, for example forming or cutting, are required, are produced, as a rule, on what are known as multiple-ram transfer presses or press lines. The number of rams corresponds the number of work stages required for production. Transport devices, which transport the workpieces from one machining station to the next, are located between the work stages. In the conventional implementation of these transport devices, gripper or carrying rails, which extend over the entire press length, are moved by means of cam-controlled drives. Gripper or holding elements that hold the workpieces are held during transport, are located on these rails. Characteristics of this type of construction are, on the one hand, the high operating reliability, but, on the other hand, the very large moved masses require correspondingly large drives.

The high costs of these conventional transport devices are one of the reasons for developing electronic transport devices. In this type of construction, the use of cam-controlled drives and of the continuous grip or carrying rails is dispensed with. Instead, each machining stage is assigned individually driven transfer devices. These may be mounted individually and centrally in the run-through direction for each machining stage, but also in pairs and in mirror-symmetry in the column region.

A transfer device of this type is described in detail in DE 100 09 574 A1. In this type of workpiece transport, an intermediate repository that is customary in conventional transport systems is dispensed with. The intermediate repository, also called an orienting station, has the task of varying the orientation of the workpieces between the machining stations so that they could be transported by the following transfer device into the next tool without any variation in orientation.

The transport systems of the more recent generation can carry out this variation in the position of the workpieces between the machining stations during transport. The variation in position may comprise the following axes of movement:

1. horizontal displacement in and opposite to the transport direction;
2. displacement transverse to the transport direction;
3. pivoting in and opposite to the transport direction;
4. pivoting transverse to the transport direction;
5. vertical height variation; and
6. oblique position in the transport direction.

These freely programmable axes of movement or degrees of freedom enable the press operator to stipulate movement characteristics for the transfer that are tool-specific, that is, coordinated with the respective workpiece. The article "Freie Programmierung des Transfers" ["Free programming of Transfer"] from Bleche Rohre profile ½, 98 describes the possibilities and advantages attributed to the use of the freely programmable electronic transfer systems. Due to this high flexibility provided by the free programming of the individual movement axes, there is undoubtedly, as described above, a considerable additional benefit for the press operator. On the other hand, of course, there is also an increase in the requirements for converting the theoretically existing possibilities into a real transfer displacement curve by programming. The high complexity of the overall system makes it difficult for the press operator to optimize the workpiece transport in terms of transport speed or output and freedom from collision.

In order to deal with this problem, a simulator is often employed. This simulator consists of two highly simplified press platens with a transfer unit. The tool bottom parts are located on the platens. In order to make the process of refitting to a new tool set in a transfer press as frictionless as possible, investigations of the transfer movements, in conjunction with the workpiece and the tool bottom parts, are carried out, as early as during the run-in, with the aid of these simulators. This procedure has proved appropriate in the past and is also used frequently.

The disadvantage of this method is that a collision check can take place only between transfer, including the crosshead, tooling and workpiece, and the tool bottom part. Collision with the movable tool top part or the ram or with the following transfer unit cannot be ruled out using the simulator described above. This disadvantage is deliberately taken into account because a simulator set-up including a driven ram and a further press stage would be too complicated and too cost-intensive.

Recently, novel possibilities, which are already partially being utilized, have been afforded by the use of modern 3D-CAD systems with corresponding kinematic modules. The simulator described above is, in this case, replaced by a CAD model, which is a digital map of the press. This CAD model contains at least the interfering edges of the collision-relevant components. By means of appropriate kinematic modules, the moved components are then simulated according to their real movement and are checked in terms of the whole of the movements for collision. Such a simulation method is described in detail in the article "Optimierung von Pressenstrassen durch Simulation" ["Optimization of Press Lines by Simulation"], which appeared in ZWF 9/1997. An attempt is made by simulation to achieve an improvement in output. The main object of optimizing press lines is, in this case, an acceleration of the material flow in the overall system. In movement simulation within the forming press, attempts have been made to take into account physical properties, such as, the oscillation behavior of workpieces or dynamic forces on suction cups, for example. The material flow within a transfer press can be optimized by means of this type of simulation, but, in particular, logistical investigations within a pressing plant can also be carried out.

The disadvantage of this simulation tool is that the operator is not given any aid to more clearly and effectively control the combination of the individual transfer movement axes into an overall movement. As before, the operator must determine the transfer displacement curve by varying the individual drives and by a subsequent synthesis of the movement axes. In modern transfer systems, however, the number of variables is so high that, as a rule, the complexity overtaxes the operator. Consequently, in practice, the displacement curve of electronic transfer is then determined in the same way that was customary in conventional mechanical transfers. The theoretical possibilities provided by electronic transfer systems with freely programmable movement axes are therefore, in practice, not utilized at all or utilized only inadequately by the press operator.

SUMMARY OF THE INVENTION

The object on which the invention is based is to provide a simulation method for transfer presses with electronic transfer, which achieves optimization of the workpiece output and a reliable avoidance of collisions by means of a simple and operator-friendly operating surface. Moreover, using this simulation method, the costs for programming and for training and commissioning are reduced.

The present invention is based on the essential idea that the manipulation of the movement of electronic transfer does not take place by a variation of the individual drives, but, instead, by an interactive variation of support points on the resulting displacement curve. The displacement curve is part of the CAD model of the transfer press. The first stipulation of the path curve, in particular of the support points, is generated automatically by the simulation software. In order to provide this automatic generation of the path curve with the support points, essentially three data sets are necessary and must be made available beforehand to the simulation software. These are:

1. Tool-independent machine data:
    These data are permanently stored and apply generally to the corresponding transfer press, such as, for example, 3D geometry press with transfer (without tooling), motional laws, limit-value transfer (distance, speed, acceleration), basic models (start/default curves) or ram movement. The ram movement can be stored in the machine data set in the case of mechanically driven transfer presses. In transfer presses with a variable ram profile, such as, for example in hydraulically or servo-electrically driven presses, the ram movement must be considered as a variable in the simulation.
2. Tool-dependent data:
    These are primarily the CAD geometry of the tools, of the workpiece and of the tooling.
3. Computation results:
    The computation results are essentially tolerance bands which are taken into account during simulation in order to avoid a collision. These tolerance bands arise due to the influence of physical properties, such as, for example, oscillations, air resistance or dynamic forces on the suckers.

Taking into account these data sets, the simulation software then calculates a transfer displacement curve, with support points, as first default. This displacement curve with support points is located directly in the 3D-press model. By manipulating the support point position, the operator can then vary the transfer displacement curve during virtual press operation. The 3D-geometries track the varied curve immediately after manipulation. During movement, all the components are checked against one another for collision. In addition to the support points, the operator has the possibility, during simulation, of varying all the pivot angles which the transfer used affords. These changes, too, are converted online during simulation and taken into account in the collision assessment.

During the forming of multiple parts, the additional degrees of freedom arising thereby may also be incorporated in the simulation. The operator's manipulation possibilities are not unrestricted. They are possible only within the framework of the transfer limit values stored in the machine data. How these transfer limit values act on the resulting transfer displacement curve is of secondary importance for the operator. The simulation software takes this into account in the background and limits the interactive "take" at a support point beyond a specific point.

During these manipulations of the transfer movements, the operator not only receives evidence of possible collisions, but also of the effects of the manipulations on the number of strokes of the plant.

By means of this simulation method, the transfer displacement curve can be optimized by relatively simple means. The simulation software then calculates from this optimized displacement curve the movement characteristics of the individual drives, which are known as the angle sets. Program data is thus obtained for the movement sequences of the transfer units for the tool-specific machine control.

Circle diagrams with the start/stop points of the individual movement axes, movement diagrams, curves of freedom of movement and also a motional 3D illustration of the complete plant are obtained as further results.

This simulation method described may take place, even at a very early phase, during the press design. The results obtained thereby are very useful for the progress of press design and, in particular, also for tool design.

BRIEF DESCRIPTION OF THE DRAWINGS

Further details and advantages of the invention may be gathered from the exemplary embodiment of the invention which is illustrated by means of the drawing in which.

DETAILED DESCRIPTION OF THE INVENTION

Figure 1:
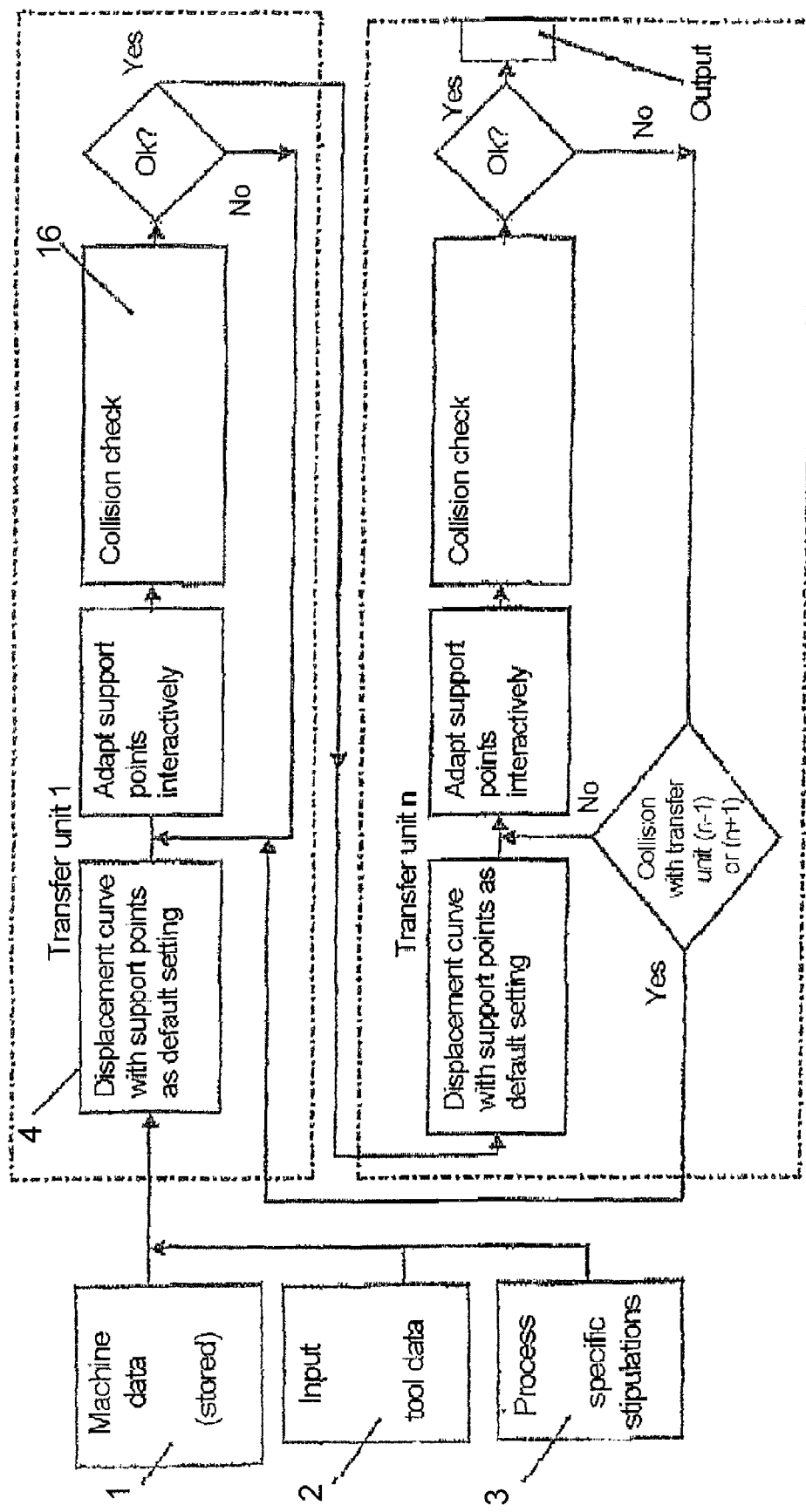
FIG. 1 is a flowchart showing the individual process steps of the simulation method.

FIG. 1 is a flowchart showing the individual process steps of the simulation method according to the invention. The data sets 1, 2, 3 as shown are made available to the system beforehand. The simulation software then calculates a displacement curve 4 with support points 8 as a default setting, initially for the transfer unit 5 of the first stage 6, and subsequently for the transfer unit of the second stage 7. In this case, the support points 8 are defined by the coordinates of the displacement curve 4.

Figure 2A:
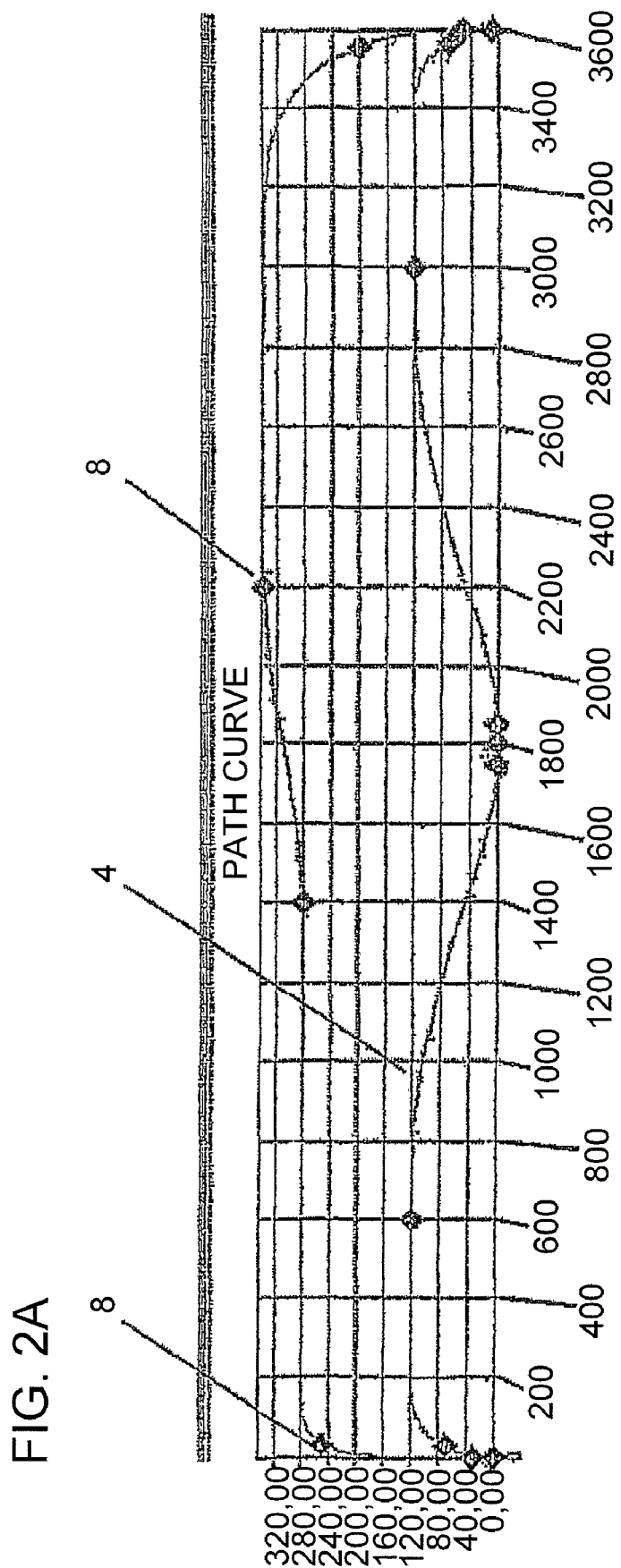
FIGS. 2A and 2B show a displacement curve and a 3D model of the operating surface based on the simulation software, respectively.
Figure 2B:
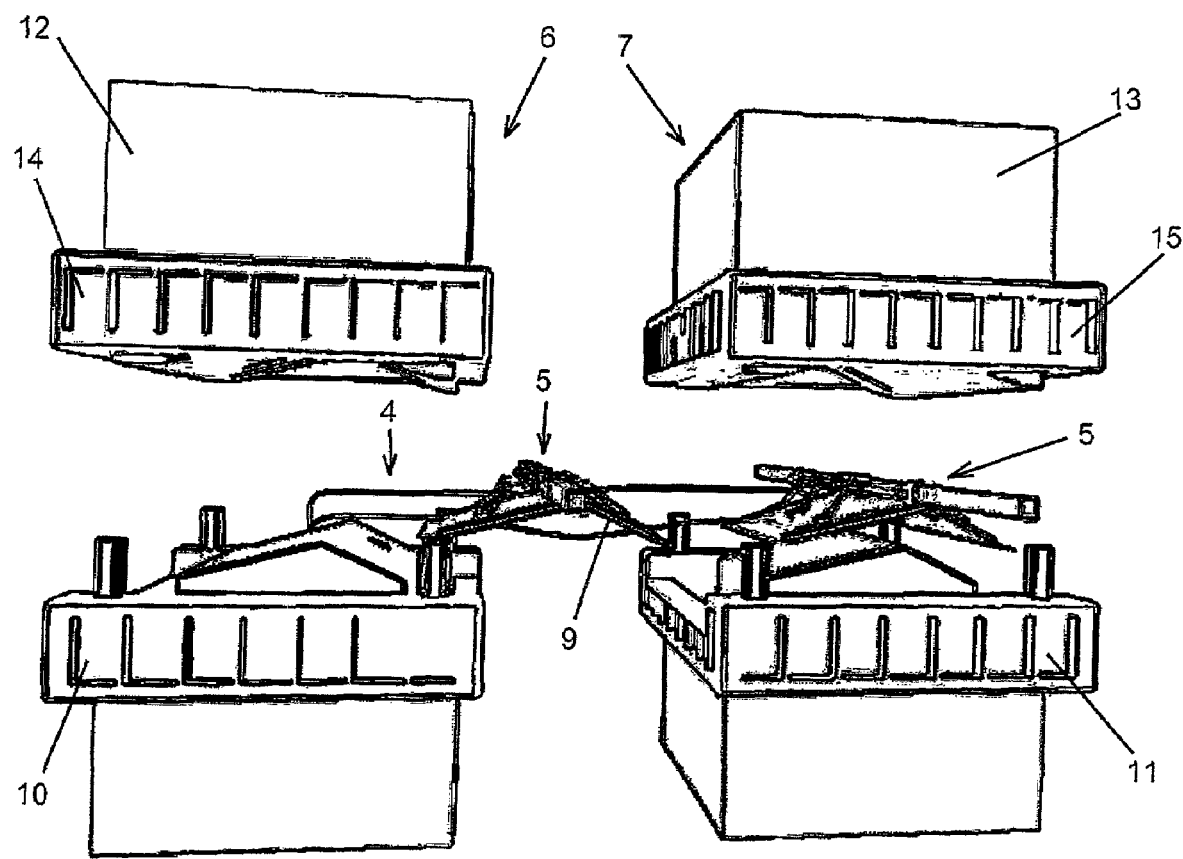

FIGS. 2A and 2B show the operating surface, as it is presented to the operator as this time point. The displacement curve 4 with support points 8 can be seen in FIG. 2A. By touching the support points 8 with the mouse pointer and subsequently distorting the support points 8, the displacement curve 4 is varied within the transfer limit values stipulated in the data sets 1, 2, 3. FIG. 2B shows the 3D CAD model of the press with the transfer units 5, illustrated in simplified form here. Two different transfer units 5 are shown, wherein the right transfer unit 5 is shown in connection with transferring a first sheet of metal out of tool 11/13 (and transports this first sheet of metal for example to a third tool which is not shown in FIG. 2) and wherein the left transfer unit 5 is shown transporting a second sheet of metal from tool 10/12 to the tool 11/13. It is an important feature of the invention to provide means to avoid a collision between the two transfer units, which the space between the two transfer unit 5 respectively between the sheets of metal is reduced to a minimum while the tool 11/13 is discharged by the right transfer unit 5 and charged by the left transfer unit 5. The displacement curve 4 corresponds exactly to the displacement curve 4 in FIG. 2A. The support points 8 could likewise be integrated directly in the 3D model. For the sake of clarity, however, the operating surface illustrated is advantageous.

In addition to the transfer units 5 carrying the workpiece 9, the tool bottom parts 10, 11 and the movable tool top parts 14, 15 that are fastened to the rams 12, 13 are also illustrated. While the operator varies the resulting displacement curve 4 by means of a "distortion" of the support points 8 in the upper region of the operating surface, the variation takes effect in the lower region directly in the moved 3D model. A collision check 16 takes place continuously. The operator can see, in an indicator, not illustrated here, which effects certain variations have on the number of strokes and therefore on the output of the overall plant. If the result is not yet satisfactory, the operator can vary the position of the support points 8 once again. Such optimization loops may be repeated as often as desired. If the result for the first transfer unit is satisfactory, there can be a change to the next stage, called transfer unit n in FIG. 1. The same steps take place here as in the transfer unit 1. The only difference is that, if the result in stage n is not satisfactory, a check must be carried out as to whether optimization within stage n is possible or whether a problem can be solved simply by a variation on the overall system, again beginning at transfer unit 1. After all the optimization stages have been run through, the output of the results can take place, as described above.

The present invention is not restricted to the exemplary embodiment described and illustrated. On the contrary, it also embraces all developments within the scope of the patent claims.

LIST OF REFERENCE SYMBOLS

1, 2, 3 represents Data sets;
4 represents Displacement curve;
5 represents Transfer unit;
6 represents First stage;
7 represents Second stage;
8 represents Support point;
9 represents Workpiece;
10, 11 reference Tool bottom parts;
12, 13 reference Ram; and
14, 15 reference Tool top parts.

We claim:

1. A simulation method for determining a movement sequence for a workpiece-specific workpiece transport as a function of one of tool movement and ram movement in a press having a plurality of machining stations and a plurality of transfer units arranged between the machining stations, the method comprising the steps of:
   supplying a data set including press machine data, tool-specific data and process-specific data to a simulator program assigned to a press control of the press;
   using the data in the simulation program to calculate a default displacement curve having coordinates corresponding to support points in a 3D CAD press model;
   using the simulation program to perform a collision check between the at least one of the tool and the ram of the press and the workpiece for at least a first press transfer unit;
   varying the support point coordinates on the displacement curve to correct an error on the displacement curve if a potential collision is detected;
   performing the collision check, and support point coordinate variation step as needed, for subsequent press transfer units;
   determining an overall collision-free movement pattern by accounting for a possible collision between the press transfer units; and
   transmitting the overall collision-free movement pattern to the press control.

2. The method according to claim 1, wherein the step of varying the support coordinates on the displacement curve is performed automatically by the simulation program.

3. The method according to claim 1, wherein the step of varying the support point coordinate is performed manually by a press operator.

4. The method according to claim 1, wherein the press control comprises at least one of a control program and a regulation program for executing the movement sequence.

5. A method for executing the movement sequence determined according to the method of claim 1 comprising using the press control to execute a movement sequence for workpiece machining.

* * * * *